United States Patent Office 2,710,295
Patented June 7, 1955

2,710,295

PROCESS FOR THE MANUFACTURE OF QUINAZOLINE COMPOUNDS

Hans Isler, Bottmingen, and Albrecht Hüni, Basel, Switzerland, assignors to Ciba Pharmaceutical Products, Inc., Summit, N. J.

No Drawing. Application December 7, 1950, Serial No. 199,717

Claims priority, application Switzerland December 23, 1949

9 Claims. (Cl. 260—256.4)

The present invention relates to a new process for the manufacture of quinazoline compounds, the carbon atom of which in 2-position is attached to the nitrogen atom of a cyclic amino compound of aromatic character and the carbon atom of which in 4-position is attached to the nitrogen atom of an amino compound of aliphatic character, which contains a further strongly basic group in addition to the amino group.

It is known that these compounds can be produced by reaction of quinazoline compounds which contain one of the said amino groups in one of the positions 2 and 4 and a halogen atom in the other of these two positions, with the corresponding amine.

A primary object of the present invention is the embodiment of a process for more advantageously preparing the said quinazoline compounds. This object is realized, according to the present invention, by heating a 2,4-dihalogen quinazoline simultaneously with an amino compound of aliphatic character which, in addition to the amino group, contains a further strongly basic group and with a cyclic amino compound of aromatic character. The 2,4-dihalogen quinazoline, which preferably is the 2,4-dichloro compound, may be further unsubstituted or may contain substituents. The amino compounds of aliphatic character which are employed as starting materials according to this invention include more especially amino-, such as dialkylamino- or alkylenimino-, for instance piperidino-, alkylamino compounds, the alkylene residues of which may also be interrupted by a hetero atom, such as oxygen or sulfur, for example dialkyl-amino-alkylthio-alkylamino or morpholino-alkylamino compounds. As cyclic amino compounds of aromatic character, use may be made of aromatic amino compounds or of heterocyclic amines of aromatic character, but the preferred compounds in this category are the amino thiazole compounds.

The reaction is advantageously carried out in a diluent, such as water, alcohol, dioxane or nitrobenzene. The reaction may, if desired, be carried out under superatmospheric pressure.

The following examples illustrate the invention in greater detail. The relation between parts by weight and parts by volume is the same as that between grams and cubic centimeters. Percentages are by weight; temperatures are in degrees centigrade.

Example 1

A mixture of 175 parts by weight of 2,4-dichloro-quinazoline, 3000 parts by volume of nitrobenzene, 154 parts by weight of 2-amino-4-phenyl-thiazole and 102 parts by weight of β-diethylamino-ethylamine is heated to a bath temperature of 170–175°. After the reaction solution has been maintained at this bath temperature for 3 to 4 hours, it is allowed to cool and the salt which crystallizes out is separated by suction filtration. It is recrystallized from a mixture of 2000 parts by volume of 96% ethanol and 250 parts by volume of water with addition of animal charcoal, the crystallization being favored by addition of 400 parts by volume of ethyl acetate. The thus-obtained dihydrochloride of the 2-[4'-phenyl-thiazolyl-(2')-amino]-4-(β-diethylamino-ethyl-amino)-quinazoline which corresponds to the formula

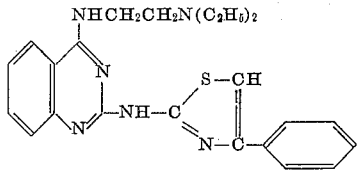

can be extracted with acetone for removal of the solvent present. It melts at 264–266° (with decomposition).

By proceeding in the manner described in the preceding paragraph, but replacing the recited reactants by equivalent quantities of the hereinafter-specified starting materials, the following compounds are obtained:

2-[6'-methyl-benzthiazolyl-(2')-amino]-4-(β-diethyl-amino-ethylamino)-quinazoline which melts at 189–191°, from 2,4-dichloro-quinazoline, β-diethylamino-ethylamine and 2-amino-6-methyl-benzthiazole;

2-[benzthiazolyl-(2')-amino]-4-(β-diethylamino-ethyl-amino)-quinazoline which melts at 216–218°, from 2,4-dichloro-quinazoline, β-diethylamino-ethylamine and 2-amino-benzthiazole;

2-[thiazolyl-(2')-amino]-4-(β-diethylamino-ethyl-amino)-6-chloro-quinazoline which melts at 180.5–181°, from 2,4,6-trichloro-quinazoline, β-diethylamino-ethyl-amine and 2-aminothiazole;

2-[benzimidazolyl-(2')-amino]-4-(β-diethylamino-ethylamino)-6-chloro-quinazoline which melts at 196–197°, from 2,4,6-trichloro-quinazoline, 2-amino-benzimid-azole and β-diethylamino-ethylamine;

2-[6'-methyl-benzimidazolyl-(2')-amino]-4-(β-diethylamino-ethylamino)-quinazoline which melts at 225–227°, from 2,4-dichloro-quinazoline, β-diethyl-aminoethylamine and 2-amino-6-methyl-benzimidazole;

2-[6'-methyl-benzthiazolyl-(2')-amino]-4-(γ-diethylamino-propylamino)-quinazoline which melts at 202–204°, from 2,4-dichloro-quinazoline, 2-amino-6-methyl-benzthiazole and γ-diethylamino-propyl-amine;

2-[6'-chloro-benzthiazolyl-(2')-amino]-4-(β-diethylamino-ethylamino)-quinazoline which melts at 210–211°, from 2,4-dichloro-quinazoline, 2-amino-6-chloro-benzthiazole and β-diethylamino-ethylamine;

2-[6'-methoxy-benzthiazolyl-(2')-amino]-4-(β-diethylamino-ethylamino)-6-chloro-quinazoline which melts at 197–198°, from 2,4,6-trichloro-quinazoline, 2-amino-6-methoxy-benzthiazole and β-diethylamino-ethyl-amine;

2-[4',7'-dimethyl-benzthiazolyl-(2')-amino]-4-(β-diethylamino-ethylamino)-quinazoline which melts at 205–207°, from 2,4-dichloro-quinazoline, 2-amino-4,7-dimethyl-benzthiazole and β-diethylamino-ethylamine;

2-[6',7'-benzo-benzthiazolyl-(2')-amino]-4-(β-diethylamino-ethylamino)-quinazoline which melts at 220°–222°, from 2,4-dichloro-quinazoline, 2-amino-6,7-benzo-benzthiazole and β-diethylamino-ethylamine;

2-[6'-nitro-benzthiazolyl-(2')-amino]-4-(β-diethylamino-ethylamino)-quinazoline which melts at 304–306°, from 2,4-dichloro-quinazoline, 2-amino-6-nitro-benzthiazole and β-diethylamino-ethylamine;

2-[4'-methyl-benzthiazolyl-(2')-amino]-4-(β-diethylamino-ethylamino)-quinazoline which melts at 193–195°, from 2,4-dichloro-quinazoline, 2-amino-4-methyl-benzthiazole and β-diethylamino-ethylamine;

2-[6'-cyano-benzthiazolyl-(2')-amino]-4-(β-diethylamino-ethylamino)-quinazoline which melts at 289–292°, from 2,4-dichloro-quinazoline, 2-amino-6-cyano-benzthiazole and β-diethylamino-ethylamine;

2-[6'-n-butoxy-benzthiazolyl-(2')-amino]-4-

(β-diethylamino-ethylamino)-quinazoline which melts at 168–169°, from 2,4-dichloro-quinazoline, 2-amino-6-n-butoxy-benzthiazole and β-diethylamino-ethylamine;

2 - [6' - acetamino - benzthiazolyl - (2') - amino] - 4 - (β-diethylamino-ethylamino)-quinazoline which melts at 252–257°, from 2,4-dichloro-quinazoline, 2-amino-6-acetamino-benzthiazole and β-diethylamino-ethylamine;

2 - [6' - methyl - benzthiazolyl - (2') - amino] - 4 - (β-piperidino-ethylamino)-quinazoline which melts at 204–206°, from 2,4-dichloro-quinazoline, 2-amino-6-methyl-benzthiazole and β-piperidino-ethylamine;

2 - [4' - (p - bromo - phenyl) - thiazolyl - (2') - amino] 4-(β-diethylamino-ethylamino)-quinazoline which melts at 219–221°, from 2,4-dichloro-quinazoline, 2-amino-4-(p-bromo-phenyl)-thiazole and β-diethylamino-ethylamine;

2 - [4',5' - diphenyl - thiazolyl - (2') - amino] - 4 - (β-diethylamino-ethylamino)-quinazoline which melts at 198–202°, from 2,4-dichloro-quinazoline, 2-amino-4,5-diphenylthiazole and β-diethylamino-ethylamine;

2 - [6' - methyl - benzthiazolyl - (2') - amino] - 4 - [1''-diethylamino-butyl-(3'')-amino]-quinazoline which melts at 142–143°, from 2,4-dichloro-quinazoline, 2-amino-6-methyl-benzthiazole and 1-diethylamino-butyl-(3)-amine;

2 - [6' - methylsulfonyl - benzthiazolyl - (2') - amino] - 4-(β-diethylamino-ethylamino)-quinazoline which melts at 267–269°, from 2,4-dichloro-quinazoline, 2-amino-6-methyl-sulfonyl-benzthiazole and β-diethylamino-ethylamine;

2 - [6' - benzyl - benzthiazolyl - (2') - amino] - 4 - (β - diethylamino-ethylamino)-quinazoline which melts at 216–218°, from 2,4-dichloro-quinazoline, 2-amino-6-benzyl-benzthiazole and β-diethylamino-ethylamine;

2 - [4',6' - dimethyl - benzthiazolyl - (2') - amino] - 4 - (β-diethylamino-ethylamino)-quinazoline which melts at 210–213°, from 2,4-dichloro-quinazoline, 2-amino-4,6-dimethyl-benzthiazole and β-diethylamino-ethylamine;

2 - [6' - sulfonamido - benzthiazolyl - (2') - amino] - 4-(β-diethylamino-ethylamino)-quinazoline which melts at 257–269°, from 2,4-dichloro-quinazoline, 2-amino-6-sulfonamido-benzthiazole and β-diethylamino-ethylamine;

2 - [4' - (p - tolyl) - thiazolyl - (2') - amino] - 4 - (β-diethylamino-ethylamino)-quinazoline which melts at 181–183°, from 2,4-dichloro-quinazoline, 2-amino-4-(p-tolyl)-thiazole and β-diethylamino-ethylamine;

2 - [6' - phenoxy - benzthiazolyl - (2') - amino] - 4 - (β-diethylamino-ethylamino)-quinazoline which melts at 197.5–198°, from 2,4-dichloro-quinazoline, 2-amino-6-phenoxy-benzthiazole and β-diethylamino-ethylamine;

2 - [6' - methyl - benzthiazolyl - (2') - amino] - 4 - [β - (β' - diethylamino-ethylthio) - ethylamino] - quinazoline which melts at 191–193°, from 2,4-dichloroquinazoline, 2-amino-6-methyl-benzthiazole and β-(β'-diethylamino-ethyl-thio)-ethylamine.

Example 2

5 parts by weight of 2,4-dichloro-quinazoline and 25 parts by volume of dioxane are mixed with 3.2 parts by weight of p-chloraniline and 2.9 parts by weight of β-diethylamino-ethylamine. Thereupon 50 parts by volume of water and 0.4 part by volume of 2 N-hydrochloric acid are added and the whole heated for 2 hours under reflux. After prolonged standing at room temperature the product is suction-filtered from a small quantity of insoluble matter which is present and, by the addition of concentrated hydrochloric acid, the dihydrochloride of 2-(p-chloranilino) - 4 - (β - diethylamino - ethylamino) - quinazoline of the formula

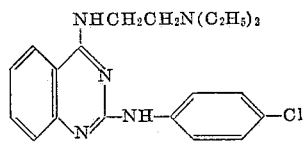

is caused to crystallize. After recrystallization from ethanol, it melts at 260–262°. From its aqueous solution by treating with caustic alkali solution, extraction with chloroform and recrystallization of the chloroform residue from benzine, the base of melting point 112–113° is obtained.

Example 3

8 parts by weight of 2,4-dichloro-quinazoline are heated, with stirring to 200° together with 5 parts by weight of p-chloraniline and 4.6 parts by weight of β-diethylamino-ethylamine. After the reaction mass has cooled, it is taken up in heated dilute hydrochloric acid and then rendered alkaline with caustic soda solution. Extraction is carried out with chloroform and the extract is shaken out with 5% acetic acid. After filtering through animal charcoal there is obtained, upon addition of concentrated hydrochloric acid to the hot acetic acid solution, the 2-(p-chloranilino) - 4 - (β - diethylamino - ethylamino) - quinazoline dihydrochloride, from which the free base which melts at 112–113°, may be obtained in the manner indicated in Example 2.

By proceeding in the manner described in the preceding paragraph, but replacing the recited reactants by equivalent quantities of the hereinafter-specified starting materials, the following compounds are obtained:

2 - (p - chlor - anilino) - 4 - (γ - diethylamino - propyl - amino)-quinazoline which melts at 125–127°, from 2,4-dichloro-quinazoline, p-chlor-aniline and γ-diethylamino-propylamine;

2 - (p - toluidino) - 4 - (γ - diethylamino - propyl - amino)-quinazoline which melts at 93–94°, from 2,4-dichloroquinazoline, p-toluidine and γ-diethylamino-propylamine;

2 - (β - naphthylamino) - 4 - (γ - diethylamino - propylamino)-quinazoline which melts at 140–142°, from 2,4-dichloro-quinazoline, β-naphthylamine and γ-diethylamino-propylamine;

2 - (p - anisidino) - 4 - (γ - diethylamino - propyl - amino)-quinazoline which melts at 112–114°, from 2,4-dichloro-quinazoline, p-anisidine and γ-diethylamino-propylamine;

2 - (β - naphthylamino) - 4 - (β - diethylamino - ethyl - amino)-quinazoline which melts at 126–127°, from 2,4-dichloro-quinazoline, β-naphthylamine and β-diethylamino-ethylamine.

Having thus disclosed the invention what is claimed is:

1. A process for the preparation of a quinazoline compound, which comprises heating a 2,4-dichloro-quinazoline with a primary aliphatic amine of the formula $$H_2N-x-y$$

wherein $x$ stands for a member selected from the group consisting of alkylene radicals and alkylene radicals interrupted by hetero atoms and $y$ stands for a tertiary amino group, and simultaneously with a member selected from the group consisting of arylamines, 2-amino-thiazoles and 2-amino-imidazoles, said hetero atoms being selected from the group consisting of oxygen and sulfur.

2. A process for the preparation of a quinazoline compound, which comprises heating a 2,4-dichloro-quinazoline with a dialkylamino-alkylamino compound and simultaneously with a 2-amino-imidazole.

3. A process for the preparation of a quinazoline compound, which comprises heating a 2,4-dichloro-quinazoline with a dialkylamino-alkylamino compound and simultaneously with a phenylamine.

4. A process for the preparation of a quinazoline compound, which comprises heating a 2,4-dichloro-quinazoline with a dialkylamino-alkylamino compound and simultaneously with a 2-amino-thiazole.

5. A process for the preparation of a quinazoline compound, which comprises heating a 2,4-dichloro-quinazoline with a dialkylamino-alkylamino compound and simultaneously with a 2-amino-benzthiazole.

6. A process for the preparation of a quinazoline compound, which comprises heating a 2,4-dichloro-quinazoline with β-diethylamino-ethylamine and simultaneously with 2-amino-4-phenyl-thiazole.

7. A process for the preparation of a quinazoline compound, which comprises heating a 2,4-dichloro-quinazoline with β-diethylamino-ethylamine and simultaneously with 2-amino-4-(para-bromo-phenyl)-thiazole.

8. A process for the preparation of a quinazoline compound, which comprises heating a 2,4-dichloro-quinazoline with β-diethylamino-ethylamine and simultaneously with 2-amino-6-methyl-benzthiazole.

9. A process for the preparation of a quinazoline compound, which comprises heating a 2,4-dichloro-quinazoline with β-diethylamino-ethylamine and simultaneously with 2-amino-4,6-dimethyl-benzthiazole.

References Cited in the file of this patent

Curd et al., J. Chem. Soc. 1947, 775–783.